United States Patent
Nalini et al.

(10) Patent No.: US 8,960,653 B2
(45) Date of Patent: Feb. 24, 2015

(54) STEAM DISTRIBUTOR FOR AIR TREATMENT SYSTEM

(75) Inventors: Luigi Nalini, Padua (IT); Roberto Cavalletto, Arzergrande (IT); Giuseppe Dominici, Padua (IT)

(73) Assignee: Carel Industries S.r.l., Brugine (PD) (IT)

( * ) Notice: Subject to any disclaimer, the term of this patent is extended or adjusted under 35 U.S.C. 154(b) by 718 days.

(21) Appl. No.: 13/270,652

(22) Filed: Oct. 11, 2011

(65) Prior Publication Data

US 2012/0085438 A1    Apr. 12, 2012

(30) Foreign Application Priority Data

Oct. 12, 2010   (EP) .................................... 10187200

(51) Int. Cl.
  *B01F 3/04*   (2006.01)
  *F24F 6/18*   (2006.01)
(52) U.S. Cl.
  CPC . *F24F 6/18* (2013.01); *Y10S 261/15* (2013.01)
  USPC .................................... 261/118; 261/DIG. 15
(58) Field of Classification Search
  CPC ......................................................... F24F 6/18
  USPC ........................... 261/118, DIG. 10, DIG. 15
  See application file for complete search history.

(56) References Cited

U.S. PATENT DOCUMENTS

| | | | | |
|---|---|---|---|---|
| 2,809,867 A * | 10/1957 | Dupasquier | ................... | 239/121 |
| 3,096,817 A * | 7/1963 | McKenna | ........................ | 165/60 |
| 3,724,180 A * | 4/1973 | Morton et al. | .................. | 55/410 |
| 4,265,840 A * | 5/1981 | Bahler | ........................... | 261/115 |
| 5,376,312 A * | 12/1994 | Morton et al. | .................. | 261/118 |
| 5,942,163 A * | 8/1999 | Robinson et al. | ............ | 261/118 |
| 6,227,526 B1 * | 5/2001 | Morton | ......................... | 261/115 |
| 6,824,127 B2 * | 11/2004 | Park et al. | ..................... | 261/118 |
| 7,150,100 B2 * | 12/2006 | Tase et al. | ............... | 29/890.036 |
| 8,220,783 B2 * | 7/2012 | Gebara et al. | ................. | 261/118 |
| 8,534,644 B2 * | 9/2013 | Lundgreen et al. | .......... | 261/118 |
| 2008/0061455 A1 * | 3/2008 | Lundgreen et al. | .......... | 261/115 |
| 2010/0047607 A1 * | 2/2010 | Gebara et al. | ................. | 428/595 |

\* cited by examiner

*Primary Examiner* — Charles Bushey
(74) *Attorney, Agent, or Firm* — Tutunjian & Bitetto, P.C.

(57) ABSTRACT

Steam distributor for air treatment units, including at least one diffusion duct provided with steam outlet orifices, and at least one outer shell for thermally shielding said diffusion duct provided with openings corresponding to said orifices of said duct.

14 Claims, 5 Drawing Sheets

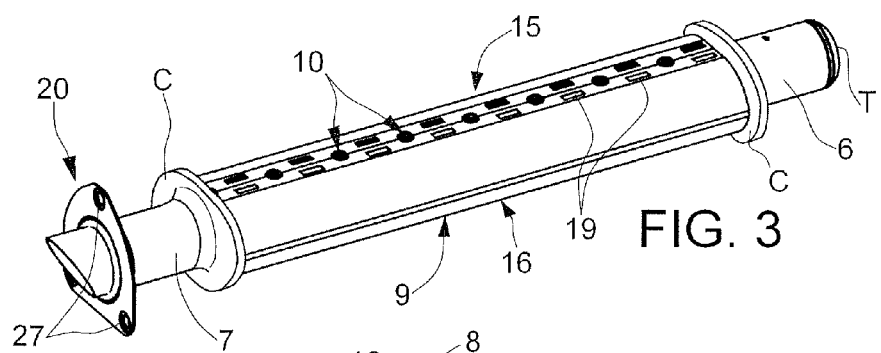
FIG. 3
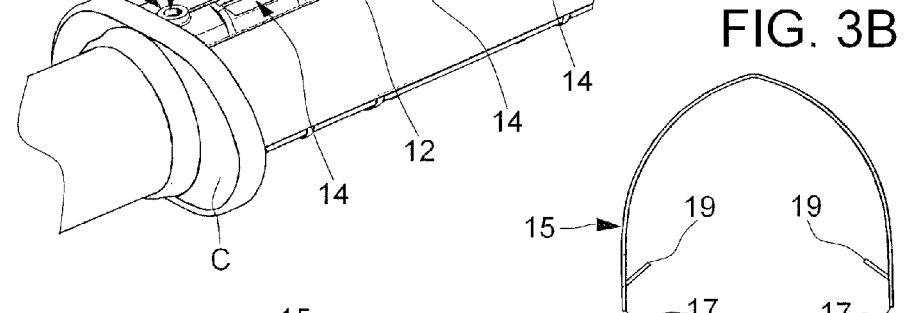
FIG. 3A
FIG. 3B
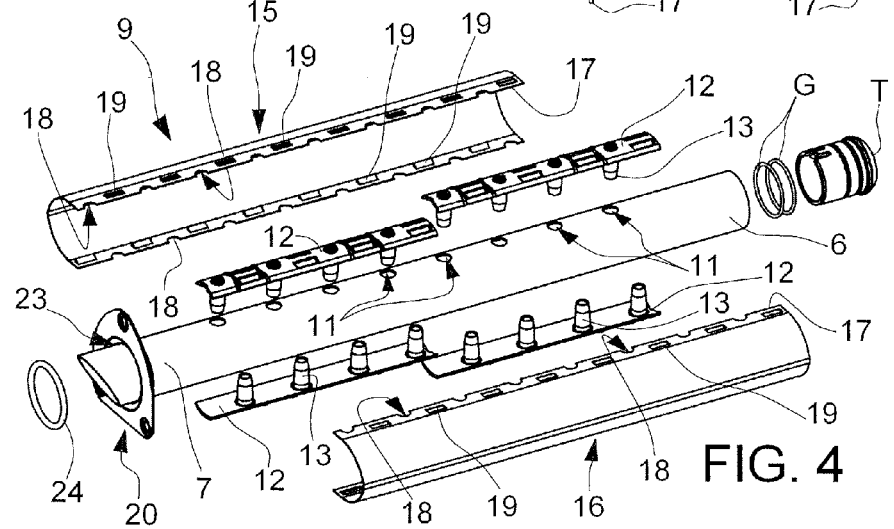
FIG. 4

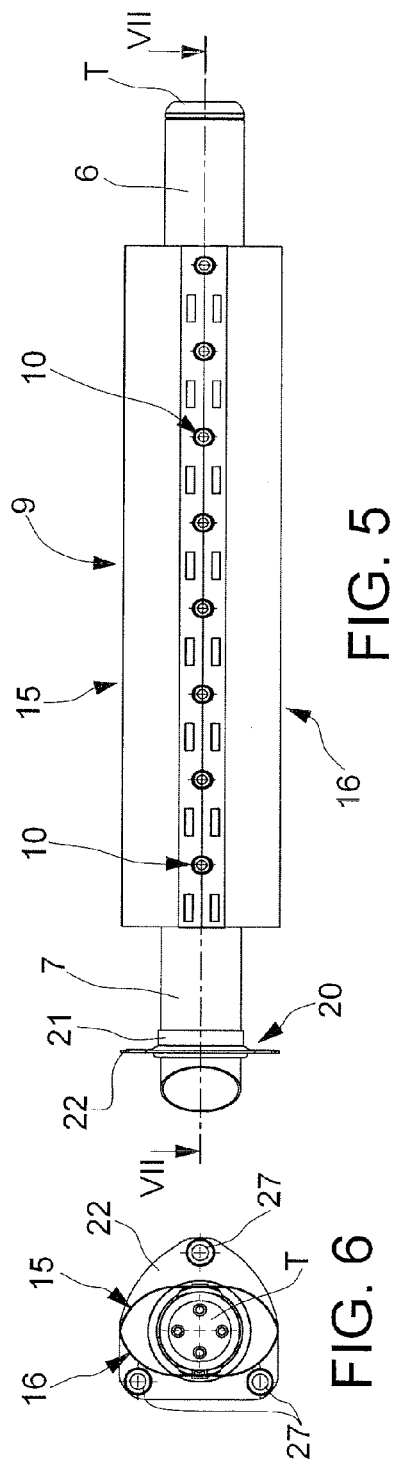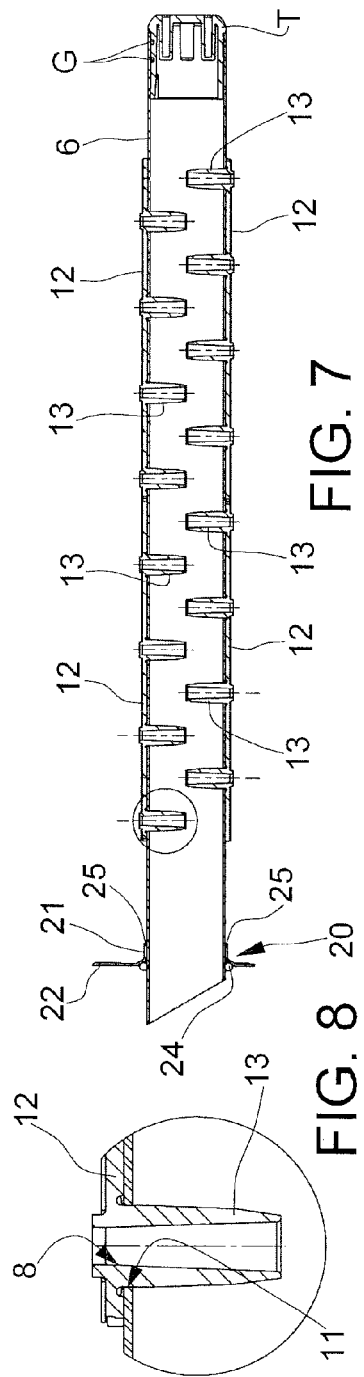

STEAM DISTRIBUTOR FOR AIR TREATMENT SYSTEM

BACKGROUND

1. Technical Field of the Invention

The present invention concerns a steam distributor for air treatment units.

2. Description of Related Art

Distributor devices are known that receive pressurised steam from a suitable centralized system and that diffuse it directly inside air treatment units installed for example in buildings, industrial buildings, and the like, and in particular inside ventilation ducts.

A typical steam for air treatment units comprises at least one manifold, connected to a unit for producing pressurized steam, from which branch out a plurality of ducts for diffusing the steam inserted inside ventilation ducts, which diffuse the steam within the air flow. Such diffusion ducts are equipped with respective orifices through which the steam comes out, which thus mixes with the air flowing in the duct. The manifold is also equipped with an outlet for the condensation that forms inside the distributor.

As known, inside the distributor a certain amount of condensation tends to form mainly due to the fact that the temperature of the air flowing in the ventilation ducts is generally quite low, for example about 15° C., and it is in any case below the temperature of the steam inside the diffusion ducts. This fact is very unwanted, since it is an indication of low energy efficiency of the distributor: indeed, the formation of a large amount of condensation signifies that a considerable part of energy expended to produce steam is wasted, since such steam is not put into the air flow inside the duct.

In order to avoid this drawback, various means for insulating the surface of the distributor have been developed that have the purpose of reducing to the minimum the formation of condensation inside the distributor itself. As stated, such minimization of the condensation, indeed, also translates into a decrease in energy consumption of the distributor and of the steam production unit, since it is thus possible to decrease the flow rate of steam that must be injected inside the diffusion ducts.

In some known distributors, such insulation means consist for example of a ceramic coating, possibly associated with a foamed material, applied as a paint, which covers each of the steam diffusion ducts. The process for applying such a ceramic coating is, however, excessively laborious and above all too expensive: therefore, in the field there is a need to reduce the time and costs relative to such a production step of the steam distributor. Moreover, the high production cost of the thermal insulation of the surfaces of the distributor inevitably has an impact upon the final price of the product: some steam distributors only have the thermal insulation as an optional feature, which the purchaser can also decide to forego precisely due to its high cost.

In other known distributors, the insulation means of steam diffusion ducts consist of shielding elements applied to the surface of the diffusion ducts. Such elements, however, are unable to ensure effective thermal insulation, since they leave some portions of the diffusion ducts completely uncovered.

SUMMARY OF THE INVENTION

The technical task of the present invention is to improve the state of the art.

Within such a technical task, according to an exemplary aspect of the present invention, a steam distributor for air treatment units equipped with effectively thermally insulated surfaces is provided, so as to reduce to a minimum the formation of condensation inside the distributor itself.

According to yet another aspect of the present invention, a steam distributor for air treatment units equipped with thermally insulated surfaces made with much lower production costs than those of known distributors, is provided.

These and other purposes are all accomplished by a steam distributor for air treatment units according to one or more of the attached claims.

An important advantage achieved by a steam distributor according to the present invention comprises the fact that the surfaces thereof, and mainly those that are licked by the air flow, are effectively and optimally thermally insulated, limiting the formation of condensation due to the low temperature of the air inside the distributor to the minimum.

Another advantage achieved by a steam distributor according to the present invention comprises the fact that the aforementioned thermal insulation is obtained in an extremely cost-effective way compared with conventional distributors.

BRIEF DESCRIPTION OF THE DRAWINGS

These and further aspects and advantages will be described or become apparent from the following description and from the attached drawings, given as a non-limiting example, in which:

FIG. 3 is a perspective view of one of the diffusion ducts with outer shell for thermally shielding the distributor of FIGS. 1, 2;

FIG. 3A is a detailed perspective view of one of the diffusion ducts, with a component removed for the sake of greater clarity;

FIG. 3B is a front view of a portion of the outer shell for shielding one of the diffusion ducts;

FIG. 4 is an exploded perspective view of one of the diffusion ducts;

FIG. 5 is a side view of one of the diffusion ducts;

FIG. 6 is a view from above of one of the diffusion ducts;

FIG. 7 is a diametral section of one of the diffusion ducts, carried out according to the plane VII-VII of FIG. 6;

FIG. 8 is a detail of FIG. 7;

DETAILED DESCRIPTION OF PREFERRED EMBODIMENTS

Figure 1:
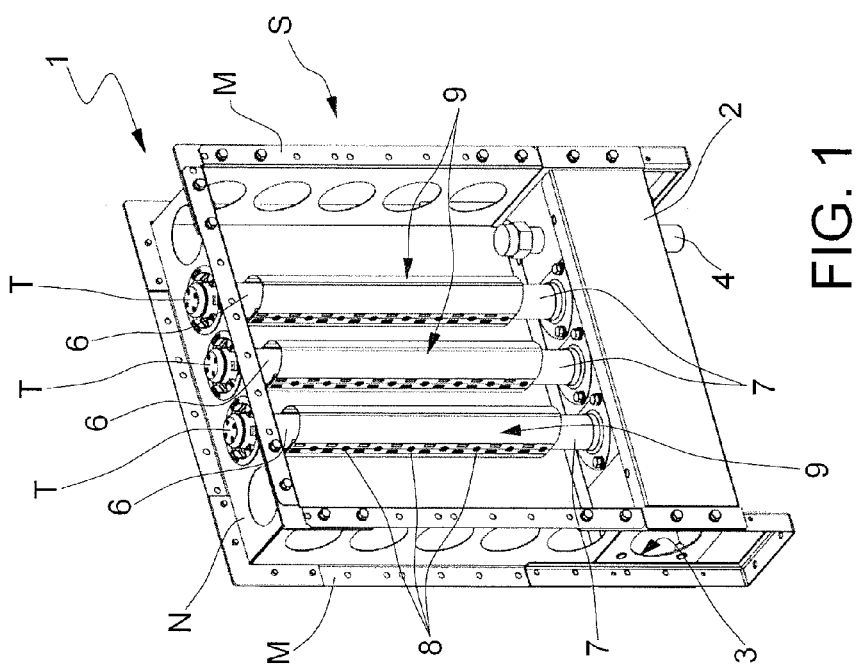
FIG. 1 is a perspective view of the steam distributor according to an aspect of the present invention.

With reference to FIG. 1, a steam distributor for air treatment units according to the invention is wholly indicated with 1.

A distributor according to the present invention can be installed in any type of air treatment unit, without any limitation.

The distributor 1 is installed at an air duct of an air treatment unit, said duct not being represented in FIG. 1 for the sake of simplicity, but being of a known and conventional type. The means for supporting and mounting the distributor 1 in the air duct are also not represented in FIG. 1 for the sake of simplicity, but they are also of the conventional type.

The distributor 1 comprises a manifold 2 for the steam to be diffused within the air flow passing through the air duct. The manifold 2 has a tubular shape with rectangular or square section, and it is made for example of metallic material or else of another material with suitable characteristics. The manifold 2 comprises a steam inlet 3, foreseen for example laterally, and at least one condensation outlet 4. In particular, the steam inlet 3 is connected to a steam production unit, not represented in the figures but of a known and conventional type.

Figure 2:
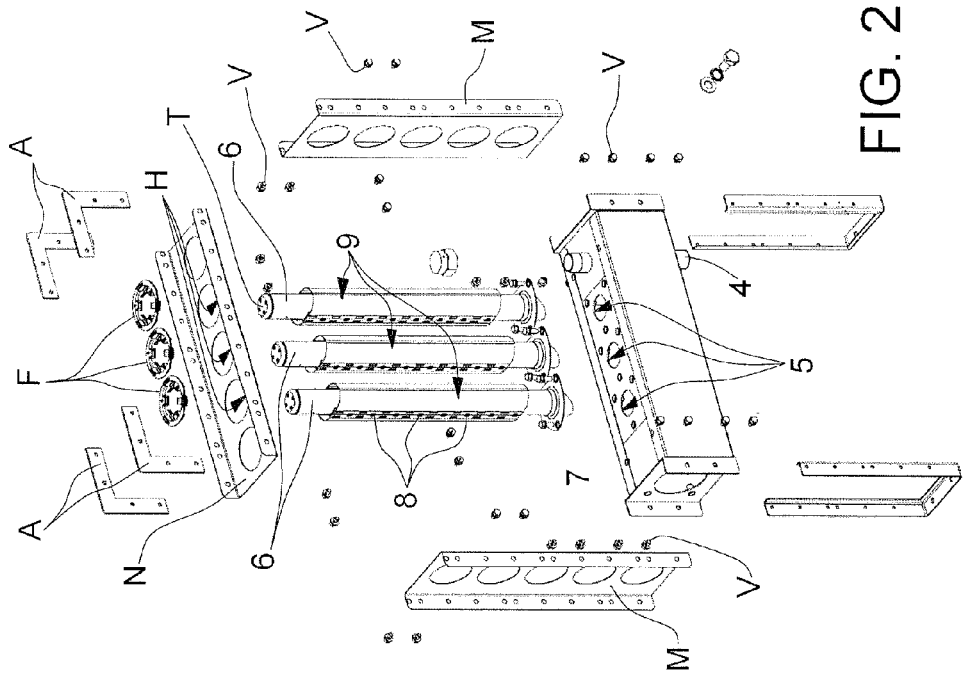
FIG. 2 is an exploded perspective view of the distributor.

Along the surface of the manifold 2, and for example along the upper face thereof, there is a plurality of steam diffusion mouths 5, for example circular, at which respective diffusion ducts 6 are mounted, see FIG. 2; the diffusion ducts 6 are mounted on the manifold 2 at respective ends 7, and are arranged with axes of symmetry that are for example perpendicular with respect to that of the manifold 2, i.e. vertical. The ends 7 extend, for a certain section, inside the manifold 2. Through such diffusion ducts 6, the steam coming from the manifold 2 is inserted within the airflow inside the air duct.

Each of the diffusion ducts 6 is closed on top by a respective lid T equipped with sealing gaskets G; moreover, each of the ducts 6 is equipped with respective steam outlet orifices 8, which can be foreseen, for example, along two diametrically opposite generatrices of the surface of the diffusion duct 6, in positions longitudinally offset from one another, as can be seen in FIG. 7, and as will be described more clearly hereafter.

The diffusion ducts 6 can be mounted on the manifold 2 for example so that the aforementioned orifices 8 are arranged with axes perpendicular with respect to the axis of the air duct, and thus perpendicular to the direction of the airflow.

As shown in FIGS. 1 and 2, the manifold 2 with the respective diffusion ducts 6 is associated with a support framework, wholly indicated with S. The support framework S comprises, in greater detail, two uprights M, fixed to the ends of the manifold 2, surmounted by a cross-member N to which the upper ends of the diffusion ducts 6 are fixed. The uprights M and the cross-member N are assembled, in a substantially known way, through screws V and angles A. Moreover, the diffusion ducts 6 are connected to the cross-member N through respective flanges F inserted inside circular windows H foreseen in the cross-member N itself.

Each of the diffusion ducts 6 comprises an outer thermal shielding shell, wholly indicated with 9; the outer shell 9 defines openings 10 corresponding to the orifices 8 of the aforementioned diffusion duct 6.

In greater detail, each diffusion duct 6, as can be seen for example in FIG. 4, has two series of holes 11, substantially aligned along two diametrically opposite generatrices of the duct 6 itself, from which the steam comes out.

The holes 11 foreseen along a generatrix are offset with respect to the holes of the other generatrix, as can be seen in particular in FIG. 7.

The outer shell 9, at holes 11, and thus along the two generatrices of the surface of the diffusion duct 6, comprises inserts 12, each made in a single piece or else in many separate pieces, for example two pieces as illustrated in FIG. 4.

Each insert 12 comprises a row of steam outlet orifices 8; the orifices 8 are equipped, at the inner surface of the insert 12, with respective substantially tubular extensions 13. Such extensions 13 mainly have the function of drawing in the steam situated mainly at the axis of the diffusion duct 6, where it is in higher pressure and temperature conditions with respect to that located by the inner surface, which on the other hand tends to condense. The extensions 13, as shown in the detail of FIG. 8, engage in the holes 11 of the diffusion duct 6, for example by pressing; the extensions 13, as can be seen in the same FIG. 8, also partially come out towards the outside for a short section.

Each insert 12 also has an outer surface along which there are two symmetrical rows of substantially rectangular seats 14, alternating with the orifices 8, the function of which is made clearer hereafter.

Each insert 12 is for example made of material like plastic, or of another material having equivalent characteristics.

The outer shell 9 of each diffusion duct 6 comprises two mirroring portions 15, 16, coupled together so as to completely surround the duct 6 itself. In greater detail, each of the portions 15, 16 has a substantially C-shaped cross-section, and is equipped, along the respective rectilinear edges 17, with semi-circular notches 18 and with tongues 19 bent inwards, better seen in the detail of FIG. 3B, alternating with the semi-circular notches 18. As can be seen in FIG. 4, along the two edges 17 of the same portion 15 or 16, the notches 18 and the tongues 19 are respectively offset, i.e. each notch 18 has a tongue 19 in front and vice-versa.

Each of the portions 15, 16 is made, for example, of metallic material, or of another material having equivalent characteristics.

In the assembled configuration, illustrated for example in FIGS. 3, 3A, 5, the rectilinear edges 17 of the portions 15, 16 fit together, so as to completely close the duct 6 inside the shell 9. More specifically, the tongues 19 are snap-engaged in the seats 14 of the inserts 12, whereas the semi-circular notches 18 surround the outer sections of the extensions 13: in this way, just said outer sections of the extensions 13 poke outside to diffuse the steam.

The shell 9 also comprises opposite closures C, which couple with the portions 15, 16 at both ends of the duct 6.

The distributor 1 comprises, for each of the diffusion ducts 6, a sealing outer protection 20 of the end 7 of the duct 6 itself, at which said duct 6 is connected to the manifold 2.

Figure 11:
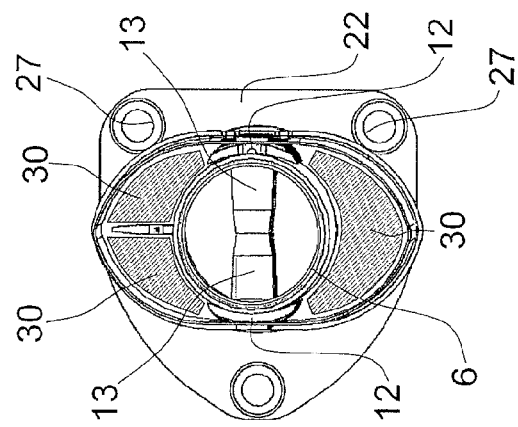
FIG. 11 is a cross section of one of the diffusion ducts of another embodiment of the steam distributor according to the invention.
Figure 10:
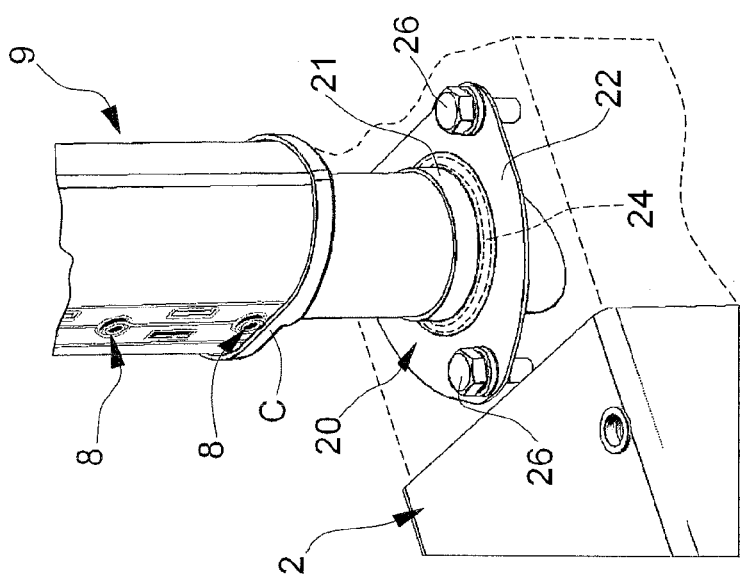
FIG. 10 is another detailed perspective view of the steam distributor.
Figure 9:
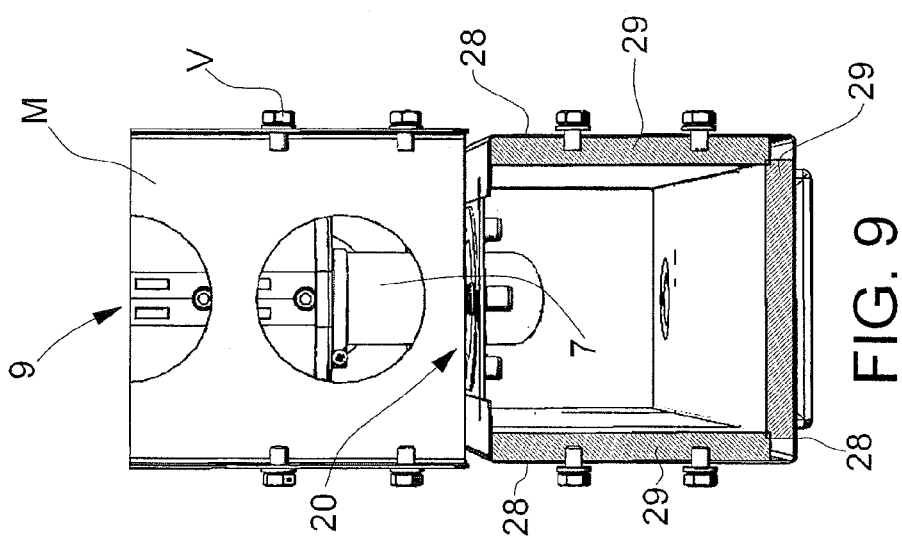
FIG. 9 is a detailed perspective section view of the steam distributor according to the invention.

Each protection 20, as can be seen for example in FIGS. 9, 10, 11 is flange shaped, and comprises a tubular portion 21 in which the aforementioned end 7 of the respective diffusion duct 6 is engaged, and a flat portion 22 for fixing onto the outer surface of the manifold 2.

Each protection 20 also comprises, between the tubular portion 21 and the flat portion 22, a housing 23 for an sealing gasket 24 on the outer surface of the manifold 2, for example an annular gasket like an "o-ring". In greater detail, the housing 23 has a frusto-conical configuration.

There are also rigid fixing means 25 of the end 7 of each diffusion duct 6 to the respective tubular portion 21 of each protection 20. Such rigid fixing means 25 consist, for example, of welds, crimping, or else other equivalent fixing means.

The flat portion 22 of the protection 20 is, on the other hand, removably fixed to the outer surface of the manifold 2 through screwing means, and in particular through three screws 26 engaged in eyelets 27 of the flat portion 22 and in respective mother screws foreseen in the manifold 2; in greater detail, such mother screws consist of blind threaded inserts that ensure the fluid-tight seal.

This solution allows significant technical advantages to be achieved. Indeed, each steam diffusion duct 6 is connected to the manifold 2 according to ways that ensure, over time, optimal structural strength and hydraulic seal, as well as quick and simple assembly and disassembly to carry out maintenance and/or replacement operations.

In practical use, indeed, the assembly of each diffusion duct 6 is carried out by simply inserting the end 7 of the duct 6 into the respective steam diffusion mouth 5, then screwing the screws 26 into the respective mother screws. In this way, as stated, there is firstly adequate structural strength thanks to the resting of the duct 6 on the flat portion 22 of the protection 20 to the presence of the fixing screws 26. Secondly, there is an adequate hydraulic seal thanks to the presence of the gasket 24 compressed by the weight of the duct 6 itself. Thirdly, each diffusion duct 6 can be quickly and easily dismounted and/or mounted.

The distributor 1 also comprises a casing 28 for thermally shielding the manifold 2, again foreseen in order to limit the formation of condensation inside the distributor itself. Such a casing 28 has a substantially C-shaped cross section with sharp edges, and with the end limbs that engage on the upper surface of the manifold 2. There are also plates 29 of insulating material inserted between the manifold 2 and the casing 28, as can be seen in FIG. 9. Such an insulating material can for example comprise melamine, or another material with low heat conductivity.

With the steam distributor according to the present invention, as described, significant technical advantages are clearly achieved.

A first advantage achieved comprises the fact that the surfaces of the distributor, and mainly those that are licked by the airflow like the surfaces of the diffusion ducts 6, are thermally insulated in an effective and optimal manner in all of their portions, so as to limit the formation of condensation due to the temperature difference between the steam in the diffusion ducts 6 and the air flowing in the air ducts to the minimum.

A second no less important advantage achieved by the distributor comprises the fact that the quoted thermal insulation is obtained, with regard to the production technologies, in an extremely cost-effective manner when compared with known conventional distributors.

Yet another technical advantage comprises the fact that the extensions 13 of the steam outlet orifices 8 are made in the inserts 12—for example by moulding—thus obtaining a substantial reduction in production costs with respect to conventional ducts, which, on the other hand, have such made, for example, with "Flow drill" technology on the same duct 6, or with other equivalent technologies.

The inserts 12, in the case in which they are made of plastic, are in any case completely enclosed between the duct 6 and the portions 15,16, that are preferably metallic and that thus protect the inserts 12 themselves in the case of fire.

Another embodiment of the steam distributor according to the present invention is illustrated, in a detail thereof, in FIG. 11.

In this embodiment, inside each outer shell 9 and around the respective diffusion duct 6, at least one strip 30 of thermally insulating material is inserted. Such an insulating material can for example be melamine, or else another material with low thermal conductivity. In greater detail, in the embodiment represented in FIG. 11 there are three strips 30 of thermally insulating material, inserted inside the shell 9 each adjacent to a respective portion 15, 16. This embodiment gives the technical advantage of further increasing the thermal insulation characteristics of the shells 9 of the diffusion ducts 6.

Figure 13:
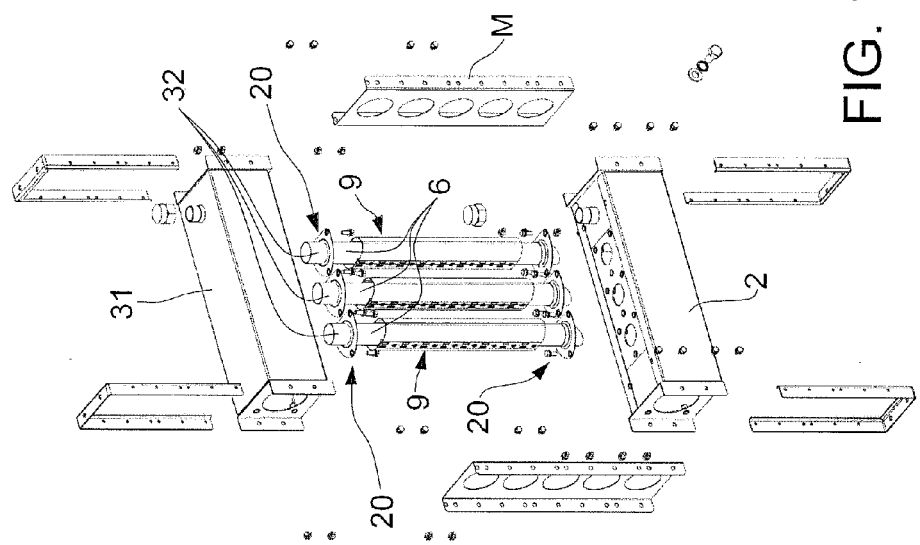
FIG. 13 is an exploded perspective view of the distributor of FIG. 12.
Figure 12:
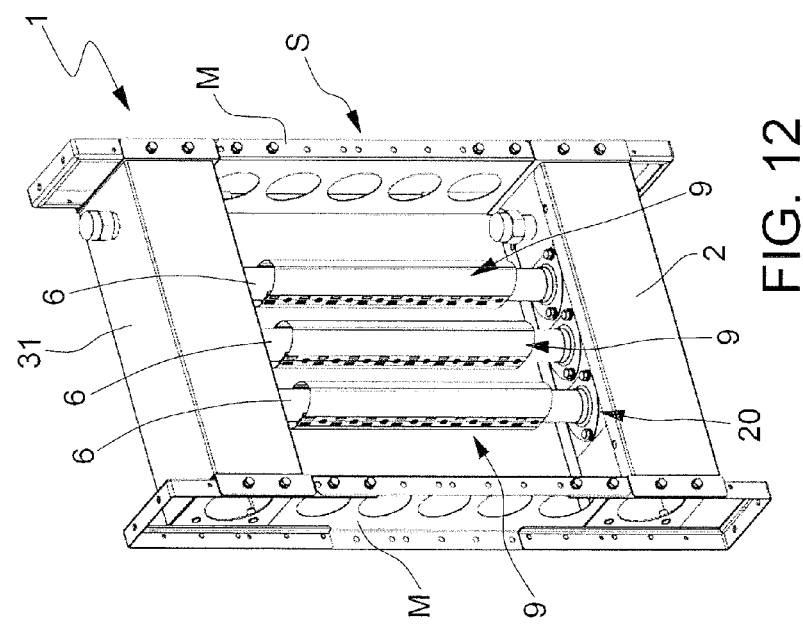
FIG. 12 is a perspective view of another embodiment of the steam distributor according to the invention.

Yet another embodiment of the steam distributor according to the present invention is represented in FIGS. 12, 13.

In this embodiment, the distributor comprises an auxiliary upper manifold 31, the presence of which makes it possible to increase the flow rate of steam that flows to the diffusion ducts 6. This embodiment is particularly, but not exclusively, recommended for large air treatment units.

The auxiliary manifold 31 is substantially identical to the manifold 2 positioned below, but it is mounted, with respect to the latter, inverted by 180°, so as to have the steam diffusion mouths 5 facing downwards. The auxiliary manifold 31 is supported by the uprights M of the framework S, in this case without the cross-member N.

The upper ends 32 of the diffusion ducts 6 are engaged in the tubular portions 21 of the flanged protections 20 fixed at the aforementioned mouths 5 of the auxiliary manifold 31; however, there are no rigid connection means between such upper ends 7 and such tubular portions 21, so as to obtain freely sliding couplings. This coupling, therefore, achieves an optimal hydraulic seal due to the presence of a gasket like the gasket 24 of the lower protection 20, and at the same time it ensures the possibility of removing each diffusion duct 6. Indeed, in order to do this it is sufficient to remove the screws 26 that connect the protection 20 to the lower manifold 2, slide the duct 6 upwards for a short section so as to disengage the lower end 7 from the tubular portion 21, and then slightly tilt the duct 6 and make it slide downwards to disengage it from the tubular portion of the upper protection 20.

It has thus been seen how the invention achieves the proposed purposes.

The present invention has been described according to preferred embodiments, but equivalent variants can be devised without departing from the scope of protection offered by the following claims.

What is claimed is:

1. A steam distributor for air treatment units, comprising at least one diffusion duct provided with steam outlet orifices, wherein each of said at least one diffusion duct comprises at least one outer shell for thermally shielding said diffusion duct, said at least one outer shell provided with openings corresponding to said steam outlet orifices of said at least one diffusion duct, wherein said steam outlet orifices of said at least one diffusion duct are provided with respective tubular extensions that project inside said diffusion duct and with respect to the surface of said diffusion duct, and that engage in said openings of said at least one outer shell, wherein said at least one outer shell comprises two portions that mirror one another coupled together so as to completely surround said at least one diffusion duct, wherein said portions define openings corresponding to said steam outlet orifices of said at least one diffusion duct, wherein said at least one diffusion duct comprises two series of holes, substantially aligned along two respective diametrically opposite generatrices of the surface of said at least one diffusion duct itself, from which the steam comes out, and further comprising at least two inserts respectively provided with said tubular extensions, engaged in said two series of holes and defining said steam outlet orifices.

2. The distributor according to claim 1, wherein each of said inserts comprises two rows series of seats that are symmetrical and alternate with said steam outlet orifices, in which tongues of said portions are intended to engage.

3. The distributor according to claim 2, wherein each of said portions comprises two respective rectilinear edges along which are provided said tongues and semi-circular notches, alternating with said tongues, which surround said tubular extensions.

4. The distributor according to claim 1, comprising at least one strip of thermally insulating material inserted inside said at least one outer shell close to said at least one diffusion duct.

5. The distributor according to claim 4, comprising a plurality of laminas of thermally insulating material, inserted inside said at least one outer shell around said at least one diffusion duct.

6. The distributor according to claim 1, comprising at least one steam manifold communicating with at least one end of said at least one diffusion duct, further comprising at least one sealing outer protection of said at least one end of said at least one diffusion duct.

7. The distributor according to claim 6, wherein said at least one sealing outer protection is flange shaped and comprises at least one tubular portion in which said end of said at least one diffusion duct is engaged, and at least one flat portion for fixing to said at least one steam manifold.

8. The distributor according to claim 7, wherein said at least one sealing outer protection comprises, between said at least one tubular portion and said at least one flat portion, at least one housing of at least one sealing gasket on said at least one steam manifold.

9. The distributor according to claim 8, wherein said at least one housing is substantially frusto-conical.

10. The distributor according to claim 7, comprising rigid fixing means for affixing said at least one end of said at least one diffusion duct to said at least one tubular portion of said at least one sealing outer protection.

11. The distributor according to claim 10, wherein said rigid fixing means comprises welds or crimping.

12. The distributor according to claim 6, comprising at least one casing for thermally shielding said at least one steam manifold.

13. The distributor according to claim 12, comprising at least one plate of insulating material inserted between said at least one steam manifold and said at least one casing.

14. A steam distributor for air treatment units, comprising:
at least one diffusion duct provided with steam outlet orifices, wherein each of said at least one diffusion duct comprises at least one outer shell for thermally shielding said at least one diffusion duct provided with openings corresponding to said steam outlet orifices or said at least one diffusion duct;
at least one steam manifold communicating with at least one end of said at least one diffusion duct, further comprising at least one sealing outer protection of said at least one end of said at least one diffusion duct, wherein said at least one sealing outer protection is flange shaped and comprises at least one tubular portion in which said at least one end of said at least one diffusion duct is engaged, and at least one flat portion for fixing to said at least one steam manifold,
wherein said at least one flat portion of said at least one sealing outer protection is fixed to said at least one steam manifold through screwing means that engage on blind threaded inserts that ensure a fluid-tight seal.

* * * * *